J. L. MILLER.
AUTOMOBILE ATTACHMENT.
APPLICATION FILED AUG. 19, 1916.

1,257,094.

Patented Feb. 19, 1918.
2 SHEETS—SHEET 1.

Witnesses

J. L. Miller
Inventor, by
Attorneys

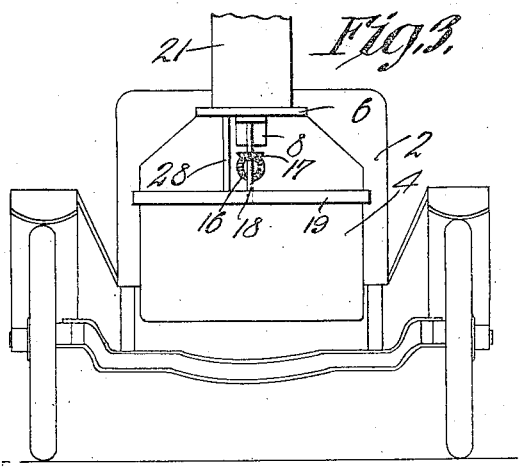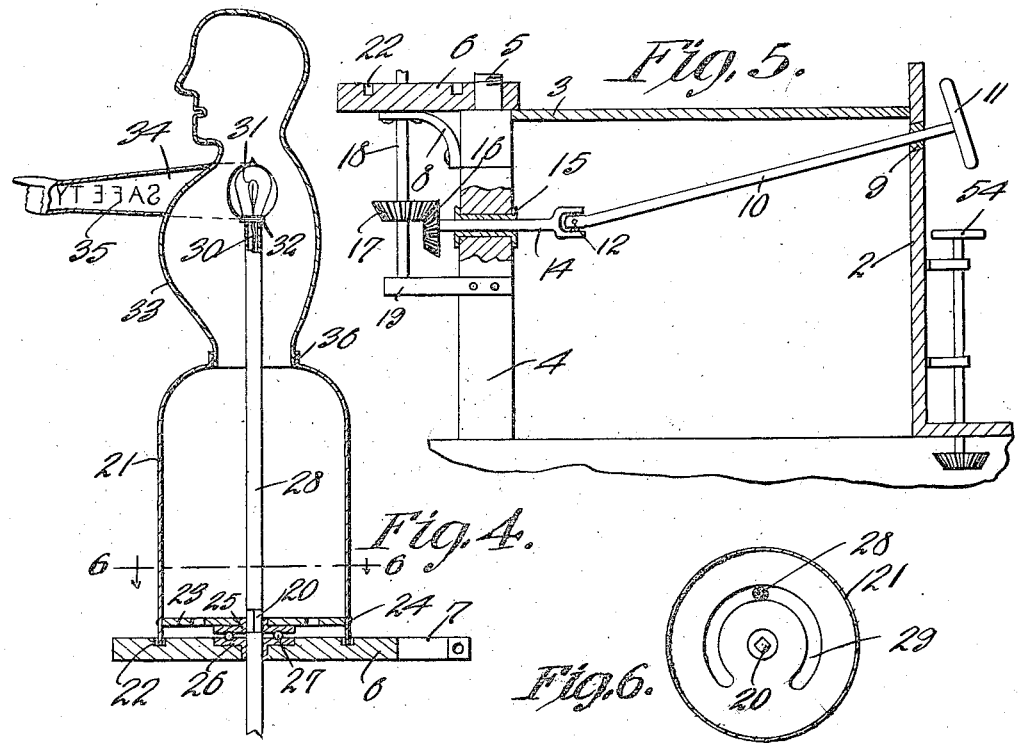

UNITED STATES PATENT OFFICE.

JOHN L. MILLER, OF FORT COLLINS, COLORADO.

AUTOMOBILE ATTACHMENT.

1,257,094.  Specification of Letters Patent.  Patented Feb. 19, 1918.

Application filed August 19, 1916. Serial No. 115,820.

*To all whom it may concern:*

Be it known that I, JOHN L. MILLER, a citizen of the United States, residing at Fort Collins, in the county of Larimer and State of Colorado, have invented a new and useful Automobile Attachment, of which the following is a specification.

The device forming the subject matter of this application is adapted to be applied to a motor propelled vehicle, for the purpose of designating the direction in which the vehicle is to turn.

The invention aims to provide novel means whereby signal at the front end of the vehicle may be manipulated, to improve the construction of the signal, and, generally, to improve and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 3 is a front elevation of a motor vehicle carrying the signal mechanism hereinafter disclosed;

Fig. 4 is a vertical section through the front signal and attendant parts.

Fig. 5 is a fragmental longitudinal section showing the means for operating the front signal; and Fig. 6 is a cross section on the line 6—6 of Fig. 4.

Figure 1:
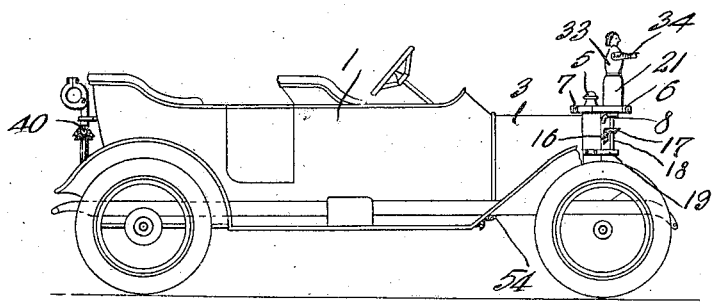
Figure 1 shows in side elevation, a motor vehicle to which the present improvements have been applied.
Figure 2:
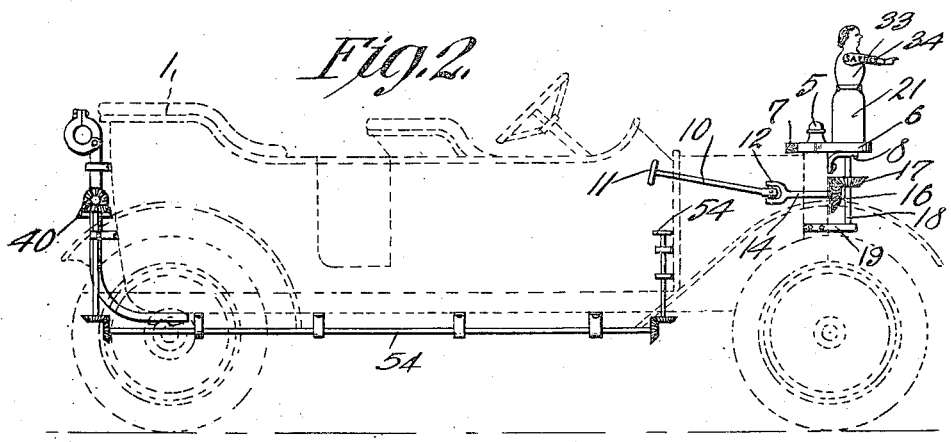
Fig. 2 is a diagrammatic side elevation showing the structure forming the subject matter of this application.

In the accompanying drawing there is shown a motor propelled vehicle including a body 1, a dash board 2, a hood 3, and a radiator 4, the radiator being provided with a filling nipple 5 at its top.

The numeral 6 designates a platform carrying on its rear edge, a clamp 7 whereby the platform 6 may be detachably secured to the nipple 5 of the radiator. Attached to the lower face of the platform 6 is a brace 8 which bears against the forward face of the radiator and aids in sustaining the platform 6.

Mounted in the dash board 2 is a bearing 9 in which is journaled a shaft 10 provided at its rear end with a hand wheel 11 which is accessible to the driver of the vehicle. By means of a universal joint 12, the shaft 10 is connected with a shaft 14 journaled in a bearing 15 carried by the radiator 4. On the forward end of the shaft 14 is a bevel pinion 16 meshing into a bevel pinion 17 secured to an upright shaft 18. The numeral 19 designates a horizontally disposed U-shaped bracket, the ends of which are attached to the radiator 4. The bracket 19 constitutes a thrust bearing for the lower end of the shaft 18. Adjacent its upper end, the shaft 18 is journaled in an opening in the ball race 26 in the platform 6. The upper end of the shaft 18 is squared as shown at 20.

The invention comprises a signal preferably having the outline of a female, and including a skirt portion 21. It is to be understood that this signal, however, may be of any desired form. The skirt portion 21 of the signal is received at its lower end, for rotation, in a groove 22 formed in the upper face of the platform 6. Located inside of the skirt 21 is a base 23 held in place by securing elements 24. A ball race 25 is attached to the lower face of the base 23, and the ball race 26 is attached to the upper face of the platform 6. Between the ball races 25 and 26 are placed anti-friction balls 27. The squared end 20 of the shaft 18 is received in a correspondingly shaped opening formed in the ball race 25 of the base 23, so that when the shaft 18 is rotated, the signal comprising the skirt 21 and attendant parts, will be rotated also.

A tube or standard 28 is carried by the bracket 19. The tube 28 extends through the platform 26, and in the base portion 23 of the signal there is formed an arcuate slot 29 through which the tube 28 passes, the construction being such that the tube, which is fixed, will not prevent a rotation of the signal, of which the base 23 and the skirt 21 constitute parts. Extended upwardly through the tube 28 is a conductor 30 connected with an electric lamp 31 mounted in a socket 32 carried by the upper end of the tube 28.

The signal comprises a bust 33 having a hollow arm 34. The arm 34 is perforated as shown at 35 to form letters which may spell the word "Safety" or any other inscription. The lamp 31 is so located that the interior of the arm 34 will be illuminated, thereby rendering the inscription at 35 visible after nightfall. The bust 33 and the skirt 21 are threaded together as shown at 36, so that the bust may be detached from the skirt, in order that the lamp 31 may be renewed, or for any other purpose.

The operation of the device as thus far described is as follows:—

When the shaft 10 is rotated by means of the hand wheel 11, the shaft 15 will be rotated, and the bevel pinion 16, meshing into the bevel pinion 17, will rotate the shaft 18, the shaft 18 rotating the signal comprising the bust 33 and the skirt 21. The arm 34, therefore, will move to the right or to the left, depending upon the direction in which shaft 10 is rotated, and will advise the drivers of approaching vehicles, and pedestrians, as to the direction in which the vehicle of which the signal 21—33 constitutes a part, is to be turned.

After nightfall, the word indicated at 35 in the arm 34 will be visible, the arm 34 being lighted up from the lamp 31. As hereinbefore pointed out, the slot 29 in the base 23 permits the signal 21—33 to be rotated, even though the tube 28 which carries the conductor 30 for the lamp 31 is relatively fixed.

The body 1 may carry a rear signal 40 and means 54 for actuating the rear signal.

Having thus described the invention, what is claimed is:—

1. In a device of the class described, a platform; a hollow signal located above the platform; a base constituting a part of the signal and coöperating with the platform to support the signal for rotation; an outstanding hollow perforated arm carried by the signal; a fixed standard projecting upwardly through the platform, the base being provided with an arcuate slot receiving the standard and permitting a rotation of the signal with respect to the standard; a lamp carried by the standard and constituting means for illuminating the arm; and means under the control of an operator for rotating the signal.

2. In a device of the class described, a platform; a fixed bracket disposed below the platform; a shaft journaled in the platform, the bracket constituting an end thrust bearing for the shaft; means for rotating the shaft from a remote point; a standard fixed to the bracket and projecting upwardly above the platform; a hollow signal mounted to rotate above the platform and housing the standard; a hollow perforated arm constituting a part of the signal; a lamp on the standard and constituting means for illuminating the arm; and means for operatively connecting the shaft with the signal.

In testimony that I claim the foregoing as my own, I have hereto affixed my signature in the presence of two witnesses.

JOHN L. MILLER.

Witnesses:
W. A. COLLINS,
B. F. SMITH.